United States Patent
Cao et al.

(10) Patent No.: US 10,031,962 B2
(45) Date of Patent: Jul. 24, 2018

(54) METHOD AND SYSTEM FOR PARTITIONING DATABASE

(71) Applicant: EMC Corporation, Hopkinton, MA (US)

(72) Inventors: Yu Cao, Beijing (CN); Xiaoyan Guo, Beijing (CN); Jidong Chen, Beijing (CN)

(73) Assignee: EMC Ip Holding Company, Hopkinton, MA (US)

( * ) Notice: Subject to any disclaimer, the term of this patent is extended or adjusted under 35 U.S.C. 154(b) by 236 days.

(21) Appl. No.: 14/038,238

(22) Filed: Sep. 26, 2013

(65) Prior Publication Data
US 2014/0114910 A1   Apr. 24, 2014

(30) Foreign Application Priority Data
Sep. 29, 2012   (CN) .......................... 2012 1 0387802

(51) Int. Cl.
G06F 17/30   (2006.01)

(52) U.S. Cl.
CPC .............................. *G06F 17/30584* (2013.01)

(58) Field of Classification Search
None
See application file for complete search history.

(56) References Cited

U.S. PATENT DOCUMENTS

| | | | | |
|---|---|---|---|---|
| 4,479,196 A * | 10/1984 | Ferrer | ...................... | H04Q 3/47 |
| 5,940,832 A * | 8/1999 | Hamada | ............ | G06F 17/30339 |
| 6,049,797 A * | 4/2000 | Guha | ................ | G06F 17/30598 |
| 7,080,101 B1 * | 7/2006 | Watson | ............ | G06F 17/30339 |
| 2006/0031189 A1 * | 2/2006 | Muras | ............... | G06F 17/30536 |
| 2006/0274062 A1 * | 12/2006 | Zhang | .................. | G06K 9/6224 |
| | | | | 345/420 |
| 2007/0106767 A1 * | 5/2007 | Yamamoto | ........ | G06F 17/30604 |
| | | | | 709/223 |
| 2009/0240664 A1 * | 9/2009 | Dinker | ................ | G06F 12/0842 |
| 2011/0016157 A1 * | 1/2011 | Bear | ................ | G06F 17/30312 |
| | | | | 707/804 |
| 2011/0282832 A1 * | 11/2011 | Rishel | ................... | G06F 9/5083 |
| | | | | 707/609 |
| 2012/0036249 A1 * | 2/2012 | Chandrasekaran | ... | G06F 9/5088 |
| | | | | 709/224 |

* cited by examiner

*Primary Examiner* — Aleksandr Kerzhner
*Assistant Examiner* — Eddy Cheung
(74) *Attorney, Agent, or Firm* — Krishnendu Gupta; Konrad R. Lee (57) ABSTRACT

The present invention relates to a method and system for partitioning a database. The method for partitioning a database comprises: grouping a plurality of entries in the database into one or more entry groups, so that entries in the same entry group are always accessed together by one or more transactions; and dividing the one or more entry groups into a set number of partitions, so that a total number of transactions that access across more than one partition is minimized. By means of the present invention, it is possible to obtain an efficient, flexible and convenient method for partitioning a database, thereby greatly improving the system performance.

12 Claims, 5 Drawing Sheets

METHOD AND SYSTEM FOR PARTITIONING DATABASE

RELATED APPLICATION

This Application claims priority from Chinese Patent Application Serial No. CN201210387802.3 filed on Sep. 29, 2012 entitled "METHOD AND SYSTEM FOR PARTITIONING DATABASE," the content and teachings of which are hereby incorporated by reference in their entirety.

FIELD

The present invention relates to the field of database partitioning, and more specifically, to database partitioning oriented towards transactional workloads.

BACKGROUND

With the constant development of computer and network technologies, the requirement for database technology gets increasingly high. As the scale of online transaction processing applications (e.g., online trading applications) keeps expanding and the amount of users keeps increasing, these applications generate more and more data and more and more highly concurrent transactions. As a result, the scalability becomes a major obstacle that affects the development of these systems. Bad scalability of a system will exert an adverse impact on the throughput and performance of the system.

To tackle the scalability problem, many Web-based companies employ a cost-effective, parallel database management system (hereinafter referred to as DBMS for short) (e.g., Greenplum Database) and partition the data and workload across a larger number of shared-nothing nodes (e.g., commodity servers). However, the scalability of online transaction processing (OLTP) applications on these DBDMs depends on the existence of an optimal database partition design, which defines how an application's data and workload are partitioned across nodes in a cluster, and how queries and transactions for these data are routed to multiple nodes. This in turn determines the number of transactions, especially the number of distributed transactions that access data stored on each node and how skewed the load is distributed across the cluster. Optimizing these two factors is critical to scaling complex systems. Hence, without a proper design, a DBMS will perform no better than a single-node system due to the overhead caused by issues of blocking, inter-node communication, and load balancing.

SUMMARY

In view of the above problems, the present invention provides a method and system for partitioning a database.

According to one aspect of the present invention, there is provided a method for partitioning a database, comprising: grouping a plurality of entries in the database into one or more entry groups, so that entries in the same entry group are always accessed together by one or more transactions; and dividing the one or more entry groups into a set number of partitions, so that a total number of transactions that access across more than one partition is minimized.

According to another aspect of the present invention, there is provided a system for partitioning a database, comprising: grouping means configured to group a plurality of entries in the database into one or more entry groups, so that entries in the same entry group are always accessed together by one or more transactions; and partitioning means configured to divide the one or more entry groups into a set number of partitions, so that a total number of transactions that access across more than one partition is minimized.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same or similar elements in the embodiments of the present disclosure.

DETAILED DESCRIPTION

The principles and spirit of the present invention will be described with reference to some exemplary embodiments that are shown in the accompanying drawings. It is to be understood that these embodiments are provided only for enabling those skilled in the art to better understand and further implement the present invention, rather than limiting the scope of the present invention in any way.

Figure 1:
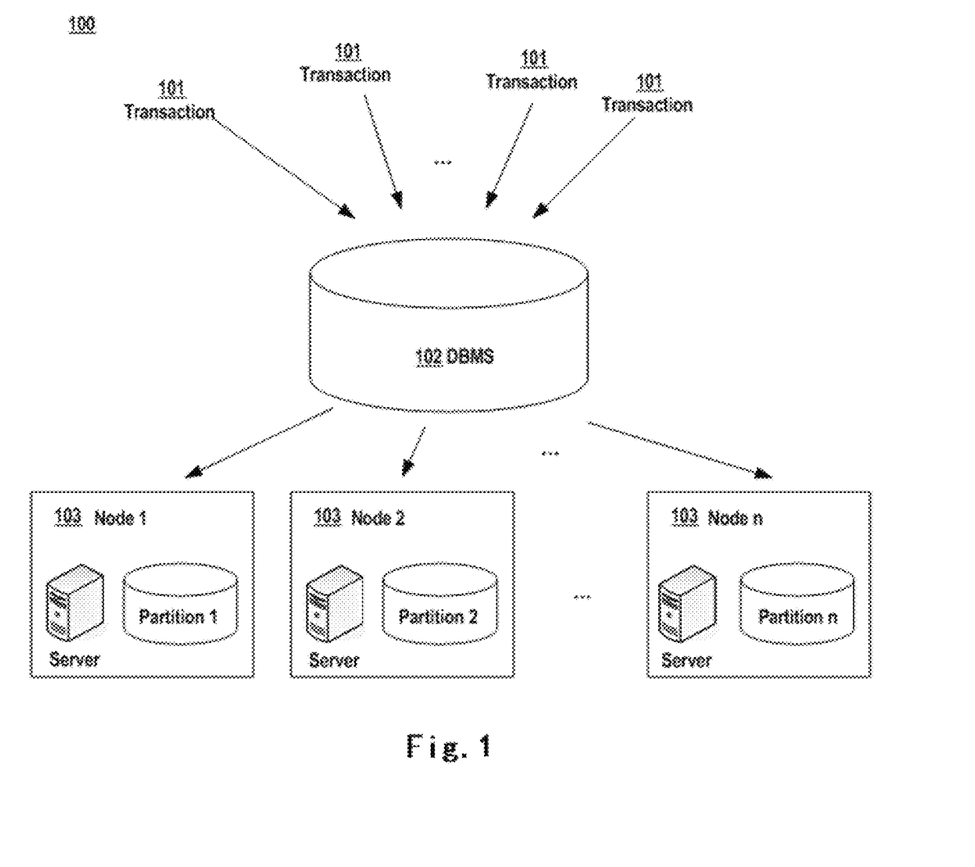
FIG. 1 shows an exemplary environment 100 in which the embodiments of the present invention may be implemented.

With reference to FIG. 1 first, this figure shows an exemplary environment 100 in which the embodiments of the present invention may be implemented.

As shown in this figure, in an exemplary environment 100, there always exist highly concurrent workloads accessing a database management system DBMS 102, and for a transactional database, workloads may include many transactions 101. Obviously, when using a single-node database system to cope with these transactions, not only there is a high requirement for the storage capacity of this single node, but also the processing ability thereof is also a challenge. Thus, a common practice is to partition a database 102 into a plurality of partitions (e.g., partition 1, partition 2, . . . , as shown in FIG. 1) that are respectively stored in a plurality of distributed nodes (e.g., 103 nodes 1–n as shown in FIG. 1). Distributed nodes 103 have corresponding servers to accomplish the processing of transactions 101. In other words, a node 102 has both a storage capacity for database partitions and a processing ability for transactions 101. In this manner, the access of many concurrent transactions 101 of DBMS 102 is dispersed as access to one or more distributed nodes 103, which on the one hand reduces the capability requirement for respective distributed nodes 103 and on the other hand accelerates the processing speed for access to transactions.

As described above, how the database is partitioned is undoubtedly critical in such an environment 100. A method 200 for partitioning a database according to one exemplary embodiment of the present invention will be described in detail with reference to FIG. 2 below. It is to be understood that the steps shown in method 200 are illustrative only. For example, these steps may be executed in a different order and even in parallel. Moreover, method 200 may further include additional steps, replace some steps or even omit some steps.

Entry Set Grouping

Figure 2:
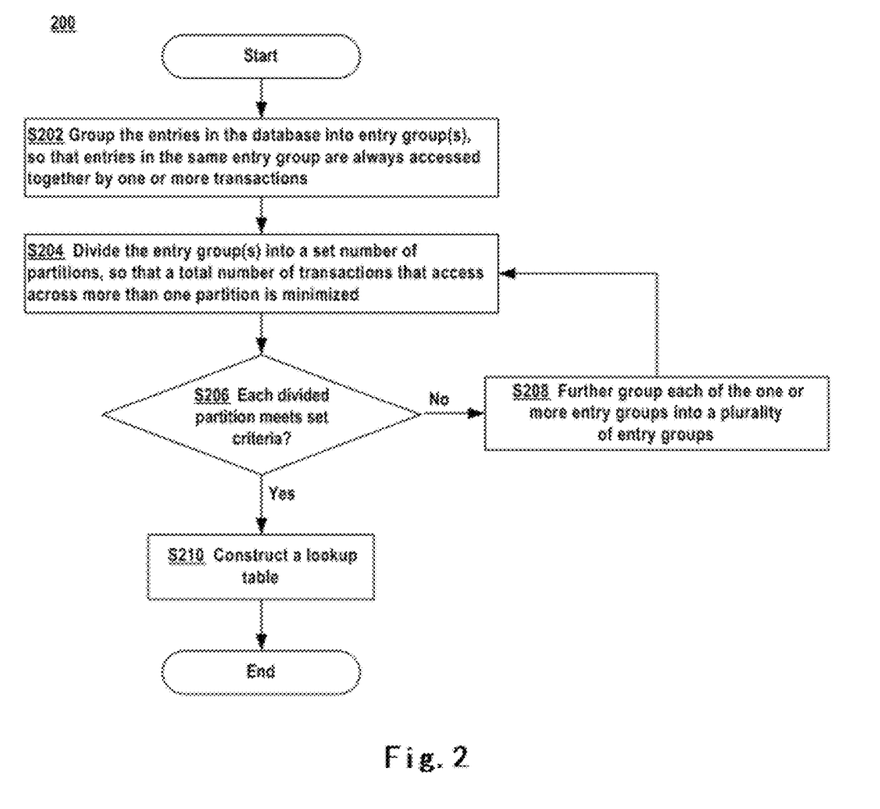
FIG. 2 shows a flowchart of a method 200 for partitioning a database according to one exemplary embodiment of the present invention.

As shown in FIG. 2, after method 200 starts, in step S202, a plurality of entries in the database are grouped into one or more entry groups such that all entries in the same entry group are always accessed together throughout the workload execution. Based on an analysis on workload and the database, this step determines entries which are always accessed together throughout the workload execution, and aggregates them into groups as the minimum unit for subsequent division. In some optional embodiments, the sizes of entry groups are derived from the database metadata and statistics stored in the system catalog. Moreover, the information about which entry groups are involved in each transaction of the workload is also recorded optionally.

Typically a database may be a relational database for example. In order to enable those skilled in the art to better understand the present invention, an exemplary implementation of step S202 is further illustrated by taking a relational database as an example. However, those skilled in the art may appreciate that other type of database is also feasible and step S202 may be implemented in other manner. The scope of the present invention is not limited in this regard.

In a relational database, database entries may be, for example, tuples. As is clear to those skilled in the art, the term "tuple" is a basic concept in the relational database, wherein the relation may be, for example, a table and each row in the table (i.e., each record in the database) may be referred to as one tuple. Thus for the relational database, step S202 may, for example, comprise dividing each table in the database into one or more tuple groups according to the information extracted from the workload. The term "tuple group" is a collection of tuples within a relation, which will always be accessed together throughout the workload execution. Each tuple group essentially represents a min-term predicate. Given a relation R, where A is an attribute of R, then a simple predicate p defined on R has the form of:

P: A θ const where const is a constant and $\theta \in \{=, <, =, >, \le, \ge\}$.

Given a set of simple predicates $\{p_1, p_2, \ldots p_n\}$ on relation R that are derived from the workload, then a min-term predicate M may be defined as:

$$M = p_1^* \char`\^ p_2^* \ldots \char`\^ p_n^*$$

where $\char`\^$ is the conjunction operation, and $p_i^* = p_i$ or $p_i^* = \neg p_i$ ($1 \le i \le n$), which means that each simple predicate can occur in a min-term predicate either in its natural form or its negated form.

The min-term predicate M has the property that all the tuples meeting it will always be accessed together by the workload. Preferably, M has two attributes: min-term size and access count, denoted by size (M) and access (M) respectively. The min-term size is the size of the tuple group of M in the actual table. The access count is the times that transactions within the workload access the tuple group of M.

Optionally, the steps for obtaining the tuple groups (i.e., min-term predicates) for each relation R are as bellow.

First, extract all the simple predicates related to relation R in the workload. Second, construct a min-term predicate list by enumerating the conjunctions of all the simple predicates of either normal or negated form. Third, eliminate those min-term predicates containing contradicting simple predicates, and simplify the min-term predicates by removing the simple predicates that are implied by other simple predicates within the same min-term predicate. In order to control the number of generated min-term predicates, preferably, the present invention could only select the top-k mostly accessed attributes of each relation for min-term predicate construction. Optionally, k is configurable by the user and currently has a preset default value (e.g., 2).

Optionally, the database meta-data and statistical information (e.g., histograms) are obtained from the underlying database system catalog, for example, and then size (M) of a min-term predicate M is estimated with methods similar to those utilized by a conventional relational database optimizer. Further optionally, to obtain the access count access (M) of M, the present invention examines each transaction in the workload and determines whether it accesses the tuple group of M. A transaction X will access the tuple group of M for each attribute A of relation R, if the set of simple predicates on A that are involved by X do not contradict M. Access (M) is equal to a total number of transactions that access the tuple group of M. Those skilled in the art should understand that the above contents are only part of the optional approaches listed in the present invention and do not constitute limitations on various aspects of the present invention.

Partitioning

Next, method 200 proceeds to step S204 in which the grouped one or more entry groups are divided into a set number (as an example, which may correspond to the number of the cluster nodes) of partitions so as to minimize a total number of transactions accessing across more than one partition. During accessing a database, one transaction usually accesses entries in multiple entry groups. It is obvious that a good partitioning scheme should put all the entries of an entry group into the same node in order to reduce the number of distributed transactions. So the basic idea of the partitioning is to first analyze and split the database into disjoint entry groups and then try to place these entry groups into n nodes of the cluster.

On one hand, as a preferred embodiment of the present invention, whether the total number of transactions that access across more than one partition has been minimized by the current partition may be judged as below: i.e., repeatedly partitioning the entry groups, and judging whether the number of distributed transactions caused by the times of partitioning has reached convergence. While determining that convergence has been reached, it may be considered (approximately) that the current partitioning is a partitioning that minimizes the number of distributed transactions. Convergence may, for example, means that the difference between the numbers of distributed transactions caused by two successive times of partitioning is less than a certain threshold (e.g., may be set by the user). It needs to be noted that this approach is merely exemplary and does not limit the scope of the present invention. Other approaches in the prior art also fall under the concept of the present invention.

On the other hand, as a preferred embodiment of the present invention, the present invention introduces a graph structure (e.g., without limitation, hyper-graph) to specifically implement step S204. It needs to be noted that using a graph structure to partition the database is merely a preferred approach and does not constitute limitation on various aspects of the present invention.

In this preferred embodiment, one or more entry groups may be mapped to vertex(es), and one or more transactions that access entries in the one or more entry groups represented by the vertex(es) may be mapped to edge(s) associated with the vertex(es), and the graph structure is generated as such. Each of such vertex(es) may have, for example, two weights: the entry group size and the number of transactions accessing this entry group. Furthermore, it is possible that some edges may represent more than one transaction. Thus, the edge may also have a weight counting the number of transactions mapped to it.

For the purpose of clarity, how the graph structure is partitioned will be illustrated below by taking a hyper-graph as an example of the graph structure. Those skilled in the art should appreciate that any other graph structures available in the prior art also fall under the concept of the present invention.

A hyper-graph extends the normal graph definition so that a hyper-edge can connect any number of vertexes. A hyper-graph HG (V, E) is constructed as follows: each vertex $v_i$ represents an entry group $M_i$; each hyper-edge $e_i = (v_1, v_2, \ldots, v_n)$ represents a transaction in workload W that accesses all the entry groups connected by this hyper-edge. A vertex $v_i$ has two kinds of weights: 1) size (M), representing a vertex size; and 2) access (M), representing the number of transactions accessing the vertex. The weight count ($e_i$) of a hyper-edge $e_i$ is the number of transactions that access the same vertexes (i.e. entry groups).

Given a hyper-graph HG(V, E), n-way partitioning of HG assigns vertexes V of HG to n disjoint nonempty partitions. The n-way partitioning problem seeks to minimize the sum of weights of cut-edges (referred to as the net cut for short), which means the number of cut hyper-edges that span more than one partition on the graph partitioning (or generally the sum of weights of such hyper-edges) is minimized.

Each cut-edge incurs at least one distributed transaction since the data that the transaction needs to access will be placed into at least two nodes. So the sum of weights of the cut-edges is equal to the total number of resulting distributed transactions.

As such, according to the above preferred embodiment, the present invention converts the database partitioning problem into a multi-constraint hyper-graph partitioning problem which aims to get the sum of weights of the minimum n-way net-cut.

Those skilled in the art should appreciate that the above hyper-graph partitioning problem may be solved by employing any existing method. An example of existing method is, for example, hMETIS. The hMETIS will tell which vertex belongs to which node, and also the sum of weights of the net cut, which represents the number of distributed transactions that would be incurred by this partitioning solution.

So far, a partitioned (e.g., n partitions) graph structure (e.g., hyper-graph) may be obtained according to the preferred embodiment of the present invention, where all vertexes contained in the $i^{th}$ (1≤i≤n) graph partition correspond to all entry groups contained in the $i^{th}$ node partition.

Through steps S202 and S204 of method 200, a partitioning approach under current entry groups of the database have been obtained, and the partitioning approach can minimize the number of distributed transactions as far as possible. According to an optional, further object of the present invention, the current partitioning effect is evaluated subsequently. The evaluation is considered mainly from, for example, the following aspects: whether the partitioning approach is feasible, whether partitions are skew, and whether the current partitioning approach is optimal, etc.

Partitioning Effect Evaluation

Therefore, optionally, method 200 proceeds to step S206 where whether each divided partition meets specified criteria is determined. As described above, the specified criteria optionally involve a storage capacity of each cluster node, a processing ability of each cluster node, a balanced level of partitions, whether the current partitioning approach is optimal, and any other possible conditions (e.g., the limited bandwidths of the network connecting the nodes).

Among the above conditions, meeting the storage capacity and processing ability of a node (usually determined by physical resources of the node itself) means the partitioning is feasible, i.e., not violating the physical constraints of the cluster. For example, the total volume of data assigned to a cluster node does not exceed its storage capacity. And the balanced level of partitions and whether the current partitioning approach is optimal involve requirements for the partitioning performance. Under a feasible premise, a primary criterion reflecting the performance is that the current partitioning approach is optimal as much as possible from a global perspective, which is mainly reflected by the number of distributed transactions. Although the current partitioning approach (tends to) minimizes the number of distributed transactions in the current entry grouping solution, since there are various entry grouping solutions, their respectively corresponding "minimal numbers of distributed transactions" are also different in good or bad. Generally speaking, among the recent times of partitioning, if the numbers of distributed transactions incurred relevantly by each partitioning that corresponds to different entry grouping solutions tend to convergence (e.g., the difference between numbers is less than a threshold that may be set by the user), then it is considered that the current partitioning approach is globally optimal, which will be described in detail below.

As a continuation of earlier, another criterion measuring the performance is whether the balanced level of partitions meets expectation (which optionally is set by the user).

To enable those skilled in the art to better understand the present invention, a method for measuring the balanced level of partitions is described below as an optional embodiment, which should not be construed as limiting the present invention.

Intuitively, when a node is assigned more data and accessed by more transactions, the speed of handling transactions at this node will be slower and thus this node is more likely to become a performance bottleneck of the whole system. Therefore, the extent of data skew and the extent of workload skew of the system resulting from a specific partitioning solution should be within a certain threshold that represents the performance expectation (e.g., of the user). Optionally, the balanced level of partitions may be measured based on one or more of the following factors: a number of partitions, sizes of partitions, a total number of transactions that access all entries in partitions, the extent of impact of storage skew on performance, and the extent of impact of processing skew on performance.

According to another preferred embodiment of the present invention, a skew factor SF may be defined as below to quantitatively measure the balanced level of partitions.

Assume a cluster with n nodes. Let $s_i$ and $t_i$ be the size of assigned database partition and the number of accessing transactions respectively, of the $i^{th}$ node. Then SF is calculated based on Equation (1) below:

$$SF = \frac{\sum_{i=1}^{n}\left(\alpha \times \left(s_i - \frac{1}{n} \times \sum_{i=1}^{n} s_i\right)^2 + \beta \times \left(t_i - \frac{1}{n} \times \sum_{i=1}^{n} t_i\right)^2\right)}{n} \quad \text{Equation (1)}$$

where α and β, with a α+β=1, are configurable non-negative parameters which may be respectively used to reflect the different performance impact factors of data skew (involving the storage capacity of a node) and workload skew (involving the processing ability of a node).

And where n denotes the number of partitions; $s_i$ and $t_i$ denote the size of entry group in the $i^{th}$ partition and the number of transactions that access the $i^{th}$ partition, respectively. Generally, a smaller value of SF (i.e., smaller extent of skew) means a better partitioning result.

During this phase, optionally, it is capable for the user to watch the visualized partitioning effects, and provide various necessary feedbacks.

Repartitioning

Return to method 200. When it is determined in step S206 that the partitioning does not meet specified criteria, as shown in FIG. 2, method 200 proceeds to step S208 where each of the one or more entry groups is further divided into multiple entry groups and step S204 is re-performed based on all current entry groups. As described above, for different entry grouping solutions, a partitioning approach of each entry grouping may be obtained through step S204, which minimizes the number of distributed transactions incurred thereby. However, from a global perspective, it is further necessary to judge based on which entry grouping solution the partitioning is done that incurs the minimal number of distributed transactions. To this end, steps S204 to S208 may be executed cyclically till the partitioning meets the above feasibility criteria (involving the storage capacity and processing ability of each cluster node) and relevant performance requirements (the minimization of the number of distributed transactions, for example, approximates to reach global optimum, the balanced level of partitions, etc.). As described above, it is noted that the most important performance requirement is typically to make the minimization of the number of distributed transactions reach global optimum. This can be reflected by the fact that partitioning effects reach convergence, for example, the numbers of distributed transactions corresponding to the recent times of partitioning as obtained through step S204 tend to convergence (as an example, the difference between the numbers of distributed transactions is less than a set threshold).

Once one or more of the above criteria are met, the method proceeds to step S210 where a lookup table is constructed (to be described in detail below).

It should be further noted that sometimes an upper limit of times of partitioning may be set (by the user, for example) for the system (not shown in FIG. 2), which represents the time budget that the user allows the system to consume before he gives up finding a feasible or better partitioning result. In this case, if a preset value of times of partitioning is reached, method 200 may end no matter whether an optimal or feasible partitioning solution is obtained or not.

As a summary of steps S204 to S208 has been described above, a preferred implementation thereof is now described in detail. Those skilled in the art should appreciate that the detailed description is presented for the clarity purpose only, rather than limiting the scope of the present invention. According to this preferred implementation of the present invention, if the partition result is neither feasible nor good enough, the present invention invokes the partitioning refinement to get a feasible and better one (steps S204 to S208). The basic principle is to split some entry groups (i.e. vertexes of the graph structure) and then redo partitioning for the according revised graph (preferably, hyper-graph).

According to an optional embodiment of the present invention, entry group splitting (step S208) is three-phase, for example. However, those skilled in the art should appreciate that the description below is merely exemplary and does not limit the present invention.

First, the vertexes of the graph structure are ranked with certain ranking function. Vertexes with higher ranks are more likely to be split. Currently, the vertex size is used as the ranking function. Alternative rank functions, e.g. the ratio of size and access frequency of vertexes, may also be utilized.

Second, the top-k vertexes are selected to split. The k is configurable by the user and currently has a default value of 20.

Last, each selected vertex V is split into two new vertexes V1 and V2. The simple predicate p with the lowest selectivity in the min-term predicate M of V is picked up and then p is broken into two simple sub-predicates, p1 and p2, with the same selectivity. V1 and V2 correspond to the new min-term predicates constructed by replacing p in M with p1 and p2 respectively. The access of an edge to V is equivalent to its access to V1 and V2. As a result, size(V1)=size(V2)=size(V)/2 and access (V1)=access(V2)=access(V).

It is seen that although graph structure refinement through splitting vertexes cannot further reduce the number of distributed transactions, the refined graph structure does contain finer-grained vertexes, which may enable feasible partitioning solutions as well as mitigate the issues of data and workload skews. Intuitively, the new graph structure (i.e., the refined graph structure) represents an expanded solution space that subsumes the space represented by the old graph structure. Since the new graph structure is usually similar to the old one, in addition to running the complete partitioning method (steps S202 to S204), the partitioning of the new graph could be done by incrementally revising the partitioning of the old graph.

Lookup Table Construction

Continue method 200. According to an optional embodiment of the present invention, when it is determined in step S206 each divided partition meets the corresponding partitioning criteria, method 200 proceeds to step S210 where a lookup table is constructed based on mapping relationships between entries in each partition and nodes storing the entries. Step S210 encodes the finally decided database partitioning strategy into a lookup table, which records the entry-to-node mappings via a compact data structure representation. This lookup table is used when both loading the database into the cluster and routing transactions to involved data nodes during workload execution.

Then, method 200 ends.

Method 200 for partitioning a database according to the present invention has been shown with reference to FIG. 2. A system 300 for partitioning a database according to one exemplary embodiment of the present invention is illustrated with reference to FIG. 3 below.

Figure 3:
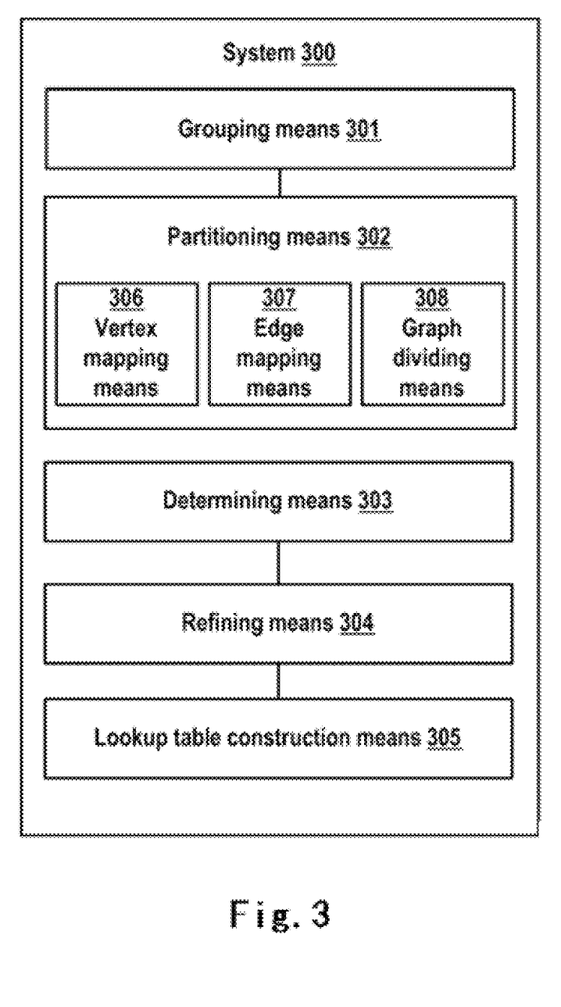
FIG. 3 shows a block diagram of a system 300 for partitioning a database according to one exemplary embodiment of the present invention.

As shown in FIG. 3, according to one embodiment of the present invention, system 300 comprises grouping means 301 and partitioning means 302, wherein grouping means 301 is configured to group a plurality of entries in the database into one or more entry groups so that entries in the same entry group are always accessed together by one or more transactions; and partitioning means 302 is configured to divide the one or more entry groups into a set number of partitions so that the number of transactions that access across more than one partition is minimized.

According to an optional embodiment of the present invention, partitioning means 302 may further comprise: vertex mapping means 306 configured to map the one or more entry groups to vertex(es); edge mapping means 307 configured to map one or more transactions accessing entries contained in one or more entry groups represented by the vertex(es) to edge(s) associated with the vertex(es), thereby generating a graph structure; and graph dividing means 308 configured to divide the graph structure into a set number of portions so that the number of cut edges is minimal, wherein each divided portion corresponds to the each partition of the database, and wherein the graph structure is preferably a hyper-graph.

According to an optional embodiment of the present invention, system 300 may further comprise: determining means 303 configured to determine whether each divided partition meets set criteria or not; refining means 304 configured to, when it is determined that the set criteria are not met, repeatedly perform the following steps till the set criteria are met: further grouping each of the one or more entry groups into a plurality of entry groups; and implementing the dividing into a set number of partitions based on all current entry groups, so that the number of transactions accessing more than one partition is minimized. The further grouping each of the one or more entry groups into a plurality of entry groups may preferably comprise: selecting the one or more entry groups for further grouping, based on the entry group size and/or the ratio of the entry group size to the frequency of accessing to the entry groups. And in the system 300, the set criteria and/or the predetermined times of partitioning may be set by the user optionally. Furthermore, in the system 300, the set criteria optionally involve one or more of: a storage capacity of each node, a processing ability of each node, a balanced level of partitions, total times of dividing, and whether results of times of dividing converge or not. In addition, the set criteria are determined by the node itself and/or set by the user. Further optionally, whether results of times of dividing converge or not comprises whether the difference between the numbers of transactions respectively associated with results of recent several times of partitioning that access across more than one partition is less than a set threshold. In the system 300, the balanced level of partitions is optionally measured based one or more of: a number of partitions, sizes of partitions, a number of transactions that access all entries in the entry, the extent of impact of storage skew, and the extent of impact of processing skew. More preferably, the balanced level of partitions is measured based on a skew factor SF:

$$SF = \frac{\sum_{i=1}^{n}\left(\alpha \times \left(s_i - \frac{1}{n}\times\sum_{i=1}^{n}s_i\right)^2 + \beta \times \left(t_i - \frac{1}{n}\times\sum_{i=1}^{n}t_i\right)^2\right)}{n}$$

where $\alpha$ denotes an impact factor of the storage skew on performance; $\beta$ denotes an impact factor of the processing skew on performance; and $\alpha$ and $\beta$, with $\alpha+\beta=1$, are configured as non-negative parameters. And where n denotes the number of partitions; $s_i$ and $t_i$ denote a size of entry group in the $i^{th}$ partition and a total number of transactions that access the $i^{th}$ partition, respectively.

According to an optional embodiment of the present invention, system 300 may further comprise: lookup table construction means 305 configured to, when it is determined that the set criteria are met, construct a lookup table based on mapping relationships between entries in the each partition and nodes storing the entries.

According to an optional embodiment of the present invention, the database involved in system 300 is a relational database.

It is to be understood that method 200 described in conjunction with FIG. 2 may be executed by system 300 described in conjunction with FIG. 3. In particular, each step in method 200 may be performed by corresponding means in system 300. Thus, various features that have been described with reference to method 200 are all applicable to functions of corresponding means in system 300, which are not detailed here.

Figure 4:
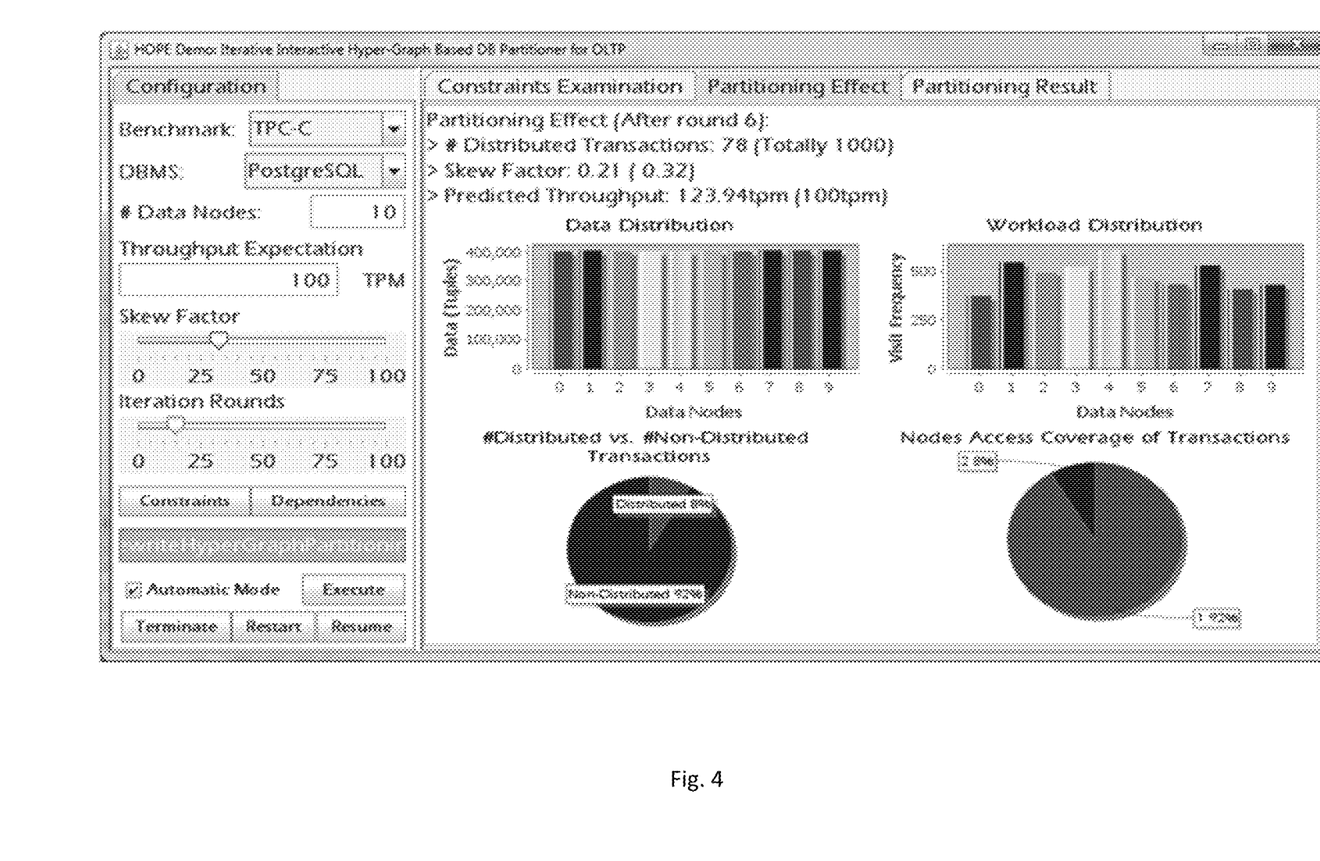
FIG. 4 shows an exemplary interface of a system for partitioning a database according to one exemplary embodiment of the present invention.

FIG. 4 illustrates an exemplary interface of system 300 for partitioning a database according to one exemplary embodiment of the present invention. As described above, the method or system for partitioning a database according to the present invention can evaluate performance standards of divided partitions. Relevant evaluation results may be obtained by the simulated execution of the workload with PEACOD, a partitioning scheme evaluation and comparison system, and also be presented.

Figure 5:
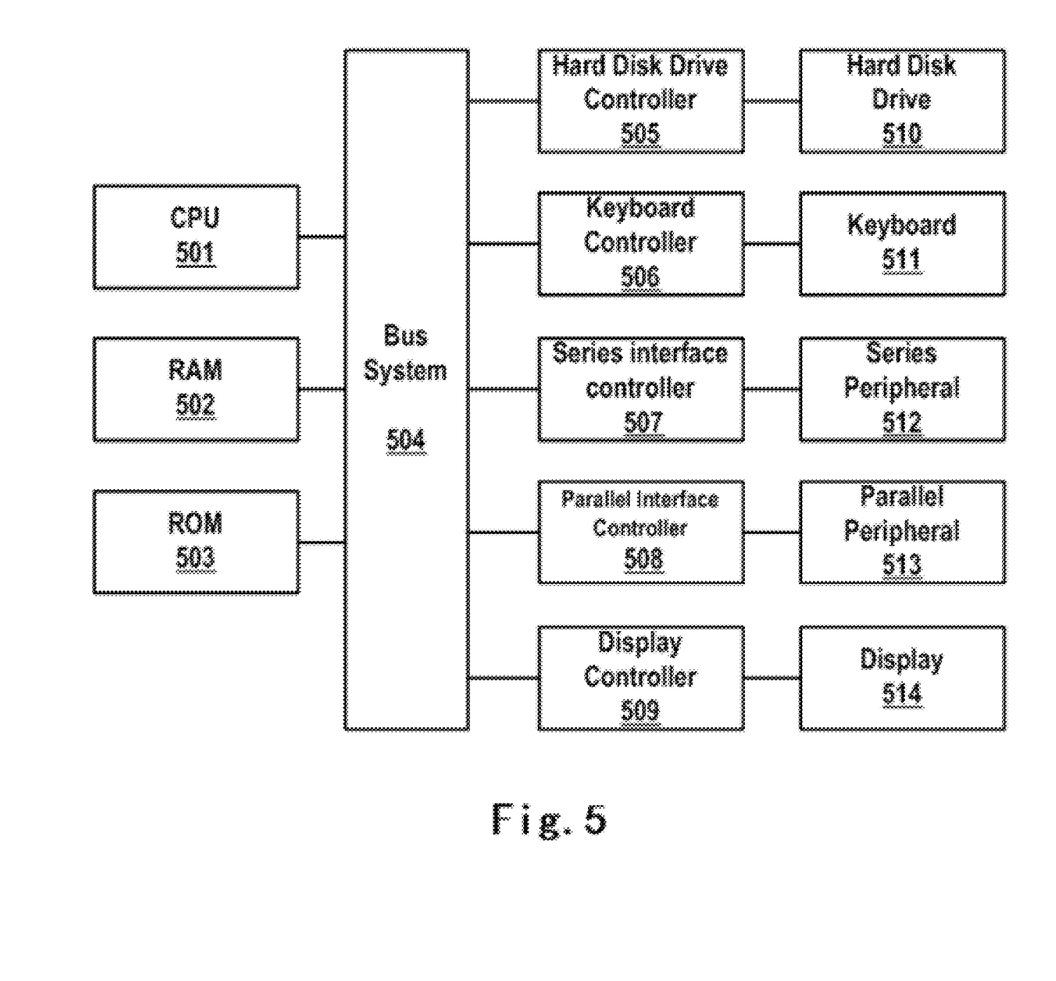
FIG. 5 shows a block diagram of a computer system 500 which is applicable to implement the embodiments of the present invention.

With reference to FIG. 5 now, this figure shows a schematic block diagram of a computer system 500 which is applicable to implement the embodiments of the present invention. For example, the computer system 500 shown in FIG. 5 may be used for implementing each means of the system 300 for partitioning a database as described above, and may be also used for solidifying or implementing each step of the method 200 for partitioning a database as described above.

As shown in FIG. 5, the computer system may include: CPU (Central Processing Unit) 501, RAM (Random Access Memory) 502, ROM (Read Only Memory) 503, System Bus 504, Hard Drive Controller 505, Keyboard Controller 506, Serial Interface Controller 507, Parallel Interface Controller 508, Display Controller 509, Hard Drive 510, Keyboard 511, Serial Peripheral Equipment 512, Parallel Peripheral Equipment 513 and Display 514. Among above devices, CPU 501, RAM 502, ROM 503, Hard Drive Controller 505, Keyboard Controller 506, Serial Interface Controller 507, Parallel Interface Controller 508 and Display Controller 509 are coupled to the System Bus 504. Hard Drive 510 is coupled to Hard Drive Controller 505. Keyboard 511 is coupled to Keyboard Controller 506. Serial Peripheral Equipment 512 is coupled to Serial Interface Controller 507. Parallel Peripheral Equipment 513 is coupled to Parallel Interface Controller 508. And, Display 514 is coupled to Display Controller 509. It should be understood that the structure block diagram as shown in FIG. 5 is only for the exemplary purpose rather than any limitation to the present invention. In some cases, some devices may be added to or removed from computer system 500 based on specific situations.

As described above, system 300 may be implemented as pure hardware, such as chip, ASIC, SOC, etc. The hardware may be integrated in computer system 500. In addition, the embodiments of the present invention may be implemented in the form of a computer program product. For example, method 200 that has been described with reference to FIG. 2 may be implemented by a computer program product. The computer program product may be stored in RAM 503, ROM 504, Hard Drive 510 as shown in FIG. 5 and/or any appropriate storage media, or be downloaded to computer system 500 from an appropriate location via a network. The computer program product may include a computer code portion that comprises program instructions executable by an appropriate processing device (e.g., CPU 501 shown in FIG. 5). The program instructions at least may comprise instructions used for executing the steps of method 200.

The spirit and principles of the present invention have been set forth above in conjunction with several embodiments. The method and system for partitioning a database according to the present invention boast many advantages over the prior art. For example, the present invention can reach quite fine-grained and accurate partitioning results and thus works well for all kinds of transactional workloads, by taking entry groups as the minimum unit of partitions. On the other hand, since entry groups are directly obtained based on the access of workloads to them, the partitioning method according to the present invention can lead to a fewer number of distributed transactions, thereby greatly improving the system performance. In addition, by splitting entry groups into smaller ones, the present invention can more easily mitigate the issues of data skew and workload skew, reduce occurrences of the performance bottleneck and further improve the system performance. By introducing the graph structure additionally, the present invention can accomplish partitioning a database more conveniently and flexibly than the prior art, and also has good scalability.

It should be noted that the embodiments of the present invention can be implemented in software, hardware or combination of software and hardware. The hardware portion can be implemented by using dedicated logic; the software portion can be stored in a memory and executed by an appropriate instruction executing system such as a microprocessor or dedicated design hardware. Those of ordinary skill in the art may appreciate the above device and method can be implemented by using computer-executable instructions and/or by being contained in processor-controlled code, which is provided on carrier media like a magnetic disk, CD or DVD-ROM, programmable memories like a read-only memory (firmware), or data carriers like an optical or electronic signal carrier. The device and its modules can be embodied as semiconductors like very large scale integrated circuits or gate arrays, logic chips and transistors, or hardware circuitry of programmable hardware devices like field programmable gate arrays and programmable logic devices, or software executable by various types of processors, or a combination of the above hardware circuits and software, such as firmware.

The communication network mentioned in this specification may comprise various kinds of networks, including, without limitation to, a local area network ("LAN"), a wide area network ("WAN"), a network according to the IP protocol (e.g., the Internet), and a peer-to-peer network (e.g., an ad hoc peer network).

It should be noted that although several means or sub-means of the device have been mentioned in the above detailed description, such division is merely exemplary and not mandatory. In fact, according to the embodiments of the present invention, the features and functions of two or more means described above may be embodied in one means. On the contrary, the features and functions of one means described above may be embodied by a plurality of means.

Although the operations of the method of the present invention have been described in a specific order in the accompanying drawings, this, by no means, requires or suggests these operations should be executed in this specific order or a desired result be achieved by executing all the operations. On the contrary, the steps depicted in the flowchart may change their order of execution. Additionally or alternatively, some steps may be omitted; a plurality of steps may be combined into one step; and/or one step may be decomposed into a plurality of steps for execution.

Although the present invention has been described with reference to several embodiments, it is to be understood that the present invention is not limited to the embodiments disclosed herein. The present invention is intended to embrace various modifications and equivalent arrangements comprised in the spirit and scope of the appended claims. The scope of the appended claims accords with the broadest interpretation, thereby embracing all such modifications and equivalent structures and functions.

What is claimed is:

1. A computer-executable method of managing a database on a data storage system, wherein the database includes one or more entries wherein each of the one or more entries interacts with one or more transactions, the computer-executable method comprising:
    grouping the one or more entries of the database into one or more entry groups, wherein each of the entry groups are accessed together by a transaction of the one or more transactions;
    determining a partition solution such that the extent of data skew and the extent of workload skew of the system resulting from the partition solution is below a predetermined threshold;
    dividing, based on the partition solution, each of the one or more entry groups into partitions, minimizing an amount each of the one or more transactions accesses more than one partition;
    distributing each of the partitions among the one or more nodes of the data storage system; and
    determining the performance by measuring the extent of data skew and workload skew of the data storage system and comparing to a threshold;
    constructing a lookup table based on relationships between entries and nodes storing the one or more entries.

2. The computer-executable method of claim 1, wherein the dividing comprises:
    mapping the one or more entry groups to one or more vertexes; and
    mapping one or more transactions accessing entries contained in one or more entry groups represented by the one or more vertexes to one or more edge(s) associated with the one or more vertexes, creating a graph structure.

3. The computer-executable method of claim 2, wherein the graph structure is a hyper-graph.

4. The computer-executable method of claim 2, further comprising:
    dividing the graph structure into two or more portions, so that the number of cut edges is minimal.

5. A system, comprising:
    a data storage system, including memory and one or more processors, utilizing one or more data storage arrays to store a database, wherein the database includes one or more entries, wherein each of the one or more entries interacts with one or more transactions; and
    computer-executable logic encoded in memory of one or more computers in communication with the data storage system to manage the database on the data storage system, wherein the computer-executable program logic is configured for the execution of:
        grouping the one or more entries of the database into one or more entry groups, wherein each of the entry groups are accessed together by a transaction of the one or more transactions;
        determining a partition solution such that the extent of data skew and the extent of workload skew of the system resulting from the partition solution is below a predetermined threshold;

dividing, based on the partition solution, each of the one or more entry groups into partitions, minimizing an amount each of the one or more transactions accesses more than one partition;

distributing each of the partitions among the one or more nodes of the data storage system; and determining the performance by measuring the extent of data skew and workload skew of the data storage system and comparing to a thresholds;

constructing a lookup table based on relationships between entries and nodes storing the one or more entries.

6. The system of claim 5, wherein the dividing comprises:

mapping the one or more entry groups to one or more vertexes; and mapping one or more transactions accessing entries contained in one or more entry groups represented by the one or more vertexes to one or more edge(s) associated with the one or more vertexes, creating a graph structure.

7. The system of claim 6, wherein the graph structure is a hyper-graph.

8. The system of claim 6, wherein the computer-executable program logic is further configured for the execution of:

dividing the graph structure into two or more portions, so that the number of cut edges is minimal.

9. A computer program product for managing a database on a data storage system, wherein the database includes one or more entries wherein each of the one or more entries interacts with one or more transactions, the computer program product comprising:

a non-transitory computer readable medium encoded with computer-executable program code for managing the database on the data storage system, the code configured to enable the execution of:

grouping the one or more entries of the database into one or more entry groups, wherein each of the entry groups are accessed together by a transaction of the one or more transactions;

determining a partition solution such that the extent of data skew and the extent of workload skew of the system resulting from the partition solution is below a predetermined threshold;

dividing, based on the partition solution, each of the one or more entry groups into partitions, minimizing an amount each of the one or more transactions accesses more than one partition;

distributing each of the partitions among the one or more nodes of the data storage system; and determining the performance by measuring the extent of data skew and workload skew of the data storage system and comparing to a threshold;

constructing a lookup table based on relationships between entries and nodes storing the one or more entries.

10. The computer program product of claim 9, wherein the dividing comprises:

mapping the one or more entry groups to one or more vertexes; and mapping one or more transactions accessing entries contained in one or more entry groups represented by the one or more vertexes to one or more edge(s) associated with the one or more vertexes, creating a graph structure.

11. The computer program product of claim 10, wherein the graph structure is a hyper-graph.

12. The computer program product of claim 10, wherein the code is further configured to enable the execution of:

dividing the graph structure into two or more portions, so that the number of cut edges is minimal.

* * * * *